United States Patent Office 3,775,386
Patented Nov. 27, 1973

3,775,386
POLYMERS HAVING SILICON CONTAINING END GROUPS AND A PROCESS FOR THEIR PREPARATION
Joel D. Citron, Wilmington, Del., assignor to E. I. du Pont de Nemours and Company, Wilmington, Del.
No Drawing. Filed May 25, 1971, Ser. No. 146,800
Int. Cl. C08f 1/78
U.S. Cl. 260—80.3 E       15 Claims

ABSTRACT OF THE DISCLOSURE

This invention provides a polymer curable with moisture, said polymer prepared by polymerizing at least one ethylenically unsaturated monomer, reactive with an azo nitrile and free of functional groups reactive with aryloxysilanes and alkoxysilanes, with an azonitrile of the formula

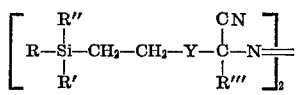

where R is alkyl, fluoro-substituted alkyl wherein the fluoro substituent is no closer than a gamma position with respect to Si, phenyl, lower alkyl-substituted phenyl, fluoro-substituted phenyl, benzyl or lower alkyl-substituted benzyl; R' is lower alkoxy, aryloxy, alkaryloxy, lower aralkoxy; R'' is independent of R and R' and is any of the groups representing R or R'; R''' is a lower alkyl, lower alkyl-substituted phenyl, benzyl, or lower alkyl-substituted benzyl wherein substitution is at other than an alpha position; Y is a saturated lower alkylene. Some polymers are particularly useful as moisture curable caulks.

BACKGROUND OF THE INVENTION

This invention relates to moisture curable polymers containing silicon containing groups, and a process for the preparation of the polymers.

Polymers which have been found to be useful as elastomers and caulking compounds typically contain cure-sites through which cross-linking can occur resulting in the formation of a vulcanizate. The cure-sites can be randomly distributed throughout each molecule of polymer, but in the case of low molecular weight polymers necessary for high solids caulks, this usually results in poor physical properties for the cured material, such as short elongation at break.

It is known in the art that silicon peroxides can be used as free radical initiators to prepare polymers containing silicon atoms, connected to the main chain through oxygen atoms. Polymers having these silicon groups are generally hydrolytically unstable after cross-linking. That is, silicon is lost upon hydrolysis.

There has been a need for a moisture curable polymer, which is solvent resistant and stable to heat and hydrolysis and which can be used as an elastomer or caulk having good physical properties. There has also been a need for a free radical polymerization process for preparing these polymers.

SUMMARY OF THE INVENTION

According to this invention there is provided a novel polymer containing silicon and curable with moisture to cross-linked polymer. This polymer is formed by polymerizing at least one ethylenically unsaturated monomer, reactive with azo nitriles and free of functional groups reactive with alkoxysilanes and acyloxysilanes, with an azonitrile of the formula

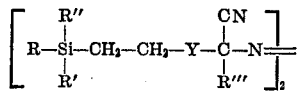

where R— is alkyl, fluoro-substituted alkyl wherein the fluoro substitutent is no closer than a gamma position with respect to

phenyl, lower alkyl-substituted phenyl, fluoro-substituted phenyl, benzyl or lower alkyl-substituted benzyl; R' is a lower alkoxy, aryloxy, alkaryloxy, lower aralkoxy; R'' is independent of R and R' and is any of the groups representing R or R'; R''' is a lower alkyl, lower alkyl-substituted phenyl, benzyl or lower alkyl-substituted benzyl wherein substitution is at other than an alpha position; —Y— is a saturated lower alkylene.

The reaction is conducted under substantially anhydrous conditions by heating the reaction mixture at about 50–110° C., preferably in an inert solvent.

According to a specific embodiment, the resulting polymer is further treated to convert one or more alkoxysilane groups in the polymer to acyloxysilane groups by reaction under substantially anhydrous conditions in an inert atmosphere with at least a stoichiometric amount of a carboxylic acid anhydride at a temperature of about 120° C. to about 200° C.

While the elastomeric polymers of the invention are preferred, non-elastomeric polymers which are moisture curable to cross-linked polymers, can also be made in accordance with the invention. Such polymers have the same general utilities as similar prior art polymers cured by conventional means.

The polymers of this invention are believed to be terminated by silicon containing end groups to the extent of about 80% and more of the polymer end groups. The polymers are moisture curable, and stable toward heat and hydrolysis after curing, and are particularly useful as "moisture curable" caulks, that is, they can be cured to elastomers by contact with water, moisture in air at room temperature, or moist vapor, for example, steam.

DESCRIPTION OF THE INVENTION

The polymers of this invention have an average of about 40–400 carbon atoms in the backbone. Some of these polymers are fluid at room temperature, that is, of relatively low bulk viscosity, making them very valuable for use as caulks. The preferred number of carbon atoms in the backbone is about 74–250.

A variety of ethylenically unsaturated monomers can be used in preparing the polymers of this invention. Monomers useful for this purpose are those which are reactive with azonitrile free radical polymerization initiators and preferably those which produce polymers which can be vulcanized to elastomer. These are known and many are disclosed in U.S. 2,471,959. The monomers should be free of functional groups which react with alkoxysilanes and acyloxysilanes under conditions of handling in accordance with this invention.

Particularly preferred monomers are chloroprene, and esters of acrylic acid $C_1$ to $C_6$, especially ethyl acrylate. Particularly preferred copolymers contain monomer units derived from perfluoromethyl vinyl ether or tetrafluoroethylene and an alkyl vinyl ether having less than 11 carbon atoms, especially methyl vinyl ether; tetrafluoroethylene, a compound of the formula

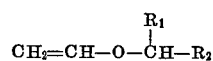

where $R_1$— is a fluoro-substituted $C_1$–$C_8$ alkyl, and $R_2$— is hydrogen or a fluoro-substituted $C_1$–$C_6$ alkyl, and optionally a hydrocarbon alkyl vinyl ether having less than 10 carbon atoms, especially methyl vinyl ether. It is particularly preferred that $R_1$ and $R_2$ be $CF_3$; or $R_2$ be H and $R_1$ be $(C_8H_2F_{13})$.

Also preferred are copolymers having units derived from tetrafluoroethylene, a hydrocarbon alkyl vinyl ether having 3–10 carbon atoms and a perfluoroalkyl vinyl ether having 3–10 carbon atoms. Other useful monomers will be apparent to those skilled in the art.

When preparing fluid polymers of this invention it is preferred that the monomer or combination of monomers have low chain transfer constants in the particular systems employed. It is especially critical that the chain transfer to solvent, if present, below. The art skilled are aware of chain transfer mechanisms. A discussion can be found in: P. J. Flory, Principles of Polymer Chemistry, Cornell University Press, Ithaca, N.Y. (1952) pp. 136–148. Chain transfer constants for commonly used monomers and solvents can be found in L. J. Young, G. Brandrup and J. Brandrup in J. Brandrup and E. H. Immergut, Ed., Polymer Handbook, Interscience Publishers, New York (1969) pp. II–77 to II–139. Chain transfer should be minimized if good polymer vulcanizate properties are desired.

The silicon containing groups which are thought to terminate the polymer molecules of this invention are incorporated into the polymer by the free radical polymerization of an ethylenically unsaturated monomer in the presence of a silicon substituted azonitrile of the formula.

$$\left[ \begin{array}{c} R'' \\ | \\ R-Si-CH_2-CH_2-Y-C-N= \\ | \quad\quad\quad\quad\quad\quad | \\ R' \quad\quad\quad\quad\quad\quad R''' \end{array} \begin{array}{c} CN \\ \\ \\ \end{array} \right]_2$$

where R is alkyl, fluoro-substituted alkyl wherein the fluoro substituent is no closer than a gamma position with respect to Si, phenyl, lower alkyl-substituted phenyl, fluoro-substituted phenyl, benzyl or lower alkyl-substituted benzyl; R'—is a lower alkoxy, aryloxy, alkaryloxy, lower aralkoxy; R" is independent of R and R' and is any of the groups R or R'; R''' is a lower alkyl, lower alkyl-substituted phenyl, benzyl, or lower alkyl substituted benzyl wherein substitution is at other than an alpha position; Y is a saturated lower alkylene.

Any of the aforementioned alkyl radicals and substituted alkyl radicals can be cycloaliphatic radicals, for example, cyclohexane. Furthermore,

can be a saturated carbocyclic ring; for example,

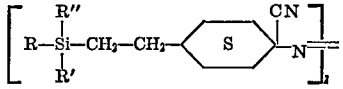

The silicon substituted azonitriles can be prepared by a series of chemical reactions, the sequence of which is critical.

The first step consists essentially of reacting an unsaturated ketone with hydrazine to form an unsaturated azine. For example, allyl acetone can be reacted with hydrazine hydrate according to the following equation

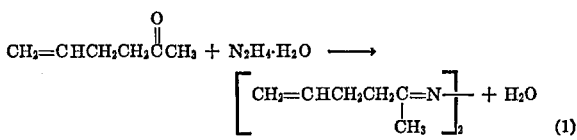

$$\left[ \begin{array}{c} CH_2=CHCH_2CH_2C=N- \\ | \\ CH_3 \end{array} \right]_2 + H_2O \quad (1)$$

The ketone employed in Equation 1 should be selected to provide the desired R'''— and —Y— radicals in the resulting silicon substituted azonitrile. For example, the allyl acetone in equation 1 can be used to prepare a novel silicon substituted azonitrile in which R'''— is $CH_3$— and Y is $(CH_2)_2$. Thus, proper selection of the unsaturated ketone as one of the starting materials is important in obtaining the desired silicon substituted azonitrile.

Some unsaturated ketones are commercially available and others can be prepared by methods well known to those skilled in the art. For example, French Patent 1,384,137 issued Nov. 23, 1964 teaches general procedures which have been found useful in preparing ketones employed in this invention.

The art skilled will recognize that the temperature at which the first reaction is conducted will depend upon the ketone employed. The more sterically hindered the carbonyl group, the higher the temperature of reaction. For the reaction represented by equation (1), the reaction is generally conducted between about 0° C. and about 120° C., preferably about 25° C. to about 105° C. Since the reaction is exothermic conventional cooling techniques can be used. If prolonged heating is required, the atmosphere above the reactants is preferably kept free of oxygen since hydrazine derivatives may be sensitive to oxidation.

The reaction is generally conducted at atmospheric pressure although higher or lower pressures can be used.

The reaction can optionally be conducted in an inert solvent. By inert is meant that the solvent does not react with the reactants or product formed. Use of a solvent is preferred when the reactants are immiscible. Further, the reactants can optionally be subjected to mild agitation.

Preferably a stoichiometric amount of the reactants is employed. A slight molar excess of the ketone can be used, however, unreacted ketone should be removed upon completion of the reaction. An excess of hydrazine should be avoided in order to prevent the formation of a hemiazine.

The unsaturated azine should be isolated from the reaction mass by conventional techniques. For example, a solid azine can be isolated by crystallization, or a liquid azine by distillation, such as at reduced pressure.

The unsaturated azine prepared in accordance with Equation 1 can be reacted with a silicon hydride in the presence of chloroplatinic acid to obtain a silicon substituted azine. Furthermore, the conditions for conducting hydrosilation reactions are applicable to reactions for preparing the silicon-substituted azines as follows:

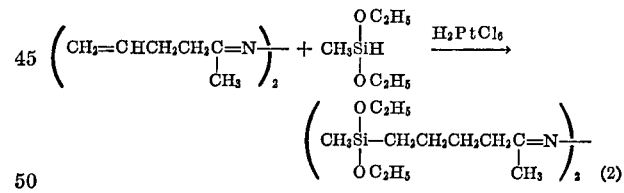

(2)

The product obtained is a silicon substituted azine.

The silicon hydride employed as a reactant in Equation 2 should be selected to provide the desired R, R' and R"— radicals in the novel silicon substituted azonitrile. For example, the silicon hydride in Equation 2 can be used to prepare a novel silicon substituted azonitrile in which R is a methyl radical and R' and R" are ethoxy radicals.

Desired silicon hydrides which are not commercially available can be prepared by methods well known to those skilled in the art. See C. Eaborn, Organosilicon Compounds, Butterworth Scientific Publications, London (1960), and V. Bazant, V. Chvalovsky, and J. Rathousky Organosilicon Compounds, Academic Press, New York (1965).

The reaction represented by Equation 2 and all the reactions which follow are conducted under substantially anhydrous conditions. This means that water and water vapor should be practically absent in order to avoid hydrolysis of silicon containing compounds.

A particularly preferred embodiment of this invention involves the use of a chlorine-containing silicon hydride in the hydrosilation reaction. By "chlorine-containing silicon hydride" is meant a silicon hydride containing chlorine in place of the alkoxy groups. This is especially preferred where the alkoxy group in the desired azonitrile is sterically bulky, such as with a t-butoxy group.

When an alkoxy containing silicon hydride is used, the reaction temperature is generally about 75° C. to about 180° C., preferably about 90° C. to about 150° C. When a chlorine-containing silicon hydride is used, the reaction should be conducted at as low a temperature as possible because of the thermal instability of the chlorosilylated azine formed. The temperature is generally about 0° C. to about 120° C., preferably about 0° C. to 100° C.

The reaction is generally conducted at atmospheric pressure or autogeneous pressure although the pressure is not critical.

Use of chloroplatinic acid in hydrosilation reactions generally is well known in the art. See, for example, U.S. Patent 2,823,218. A catalytic amount is used herein. The catalyst is preferably used in an amount of about 0.001 to about 0.05 mole percent based on the unsaturated azine.

A solvent is not required, but can be used. Mild agitation can also be used.

The reaction is generally conducted in an inert atmosphere substantially free of water vapor. A nitrogen atmosphere is preferred.

A stoichiometric amount of the silicon hydride with respect to the unsaturated azine can be used. A slight molar excess, e.g., about 10 percent, of the silicon hydride can also be used to assure hydrosilation of both end groups of the unsaturated azine.

It is preferable to isolate the silicon substituted azine from the reaction mass before proceeding with the preparation of the novel silicon substituted azonitrile. Isolation can be accomplished by conventional techniques. Chlorine containing silicon substituted azines may not be distillable, but can be converted to alkoxysilane substituted azines and then distilled.

The conditions for conducting hydrosilation reactions are known to those skilled in the art. See, for example, E. Lukevits and M. Voronkov, Organic Insertion Reactions of Group IV Elements, Consultants Bureau, New York (1966), pp. 242–293. It has surprisingly been found that these conditions are generally applicable to reactions such as that represented by Equation 2.

The next step in the process consists essentially of reacting the silicon-substituted azine with at least a stoichiometric amount of anhydrous hydrogen cyanide to form a hydrazonitrile. For example, the silicon-substituted azine prepared according to Equation 2 can be reacted as follows:

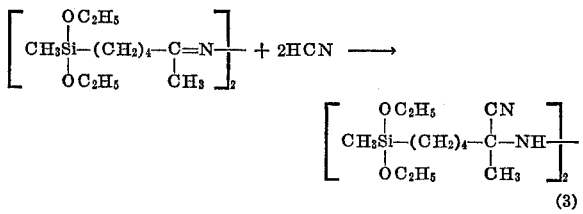

(3)

This reaction is typically conducted in an enclosed reaction vessel at about 25° C. to about 100° C., preferably about 70° C. to about 80° C. The pressure in the vessel should be such as to contain HCN at the reaction temperature. Generally low pressures are employed. An excess of HCN can be used.

This reaction can be conducted with mild agitation in the presence of a solvent, for example hexane or ethyl ether, if desired. The solvent should be inert, that is, it should not react with the silicon-substituted azine, hydrogen cyanide or hydrazonitrile.

When a solvent is used, the hydrazonitrile can be isolated by removing unreacted HCN by vacuum distillation at room temperature or lower. For example, a 1.0 mm. vacuum can be applied to the reaction mixture until no more volatiles are removed. It is important to maintain the hydrazonitrile in a substantially anhydrous condition at room temperature or below.

The fourth step in the process is the oxidation of the hydrazonitrile in a suitable solvent with about a stoichiometric amount of chlorine and then treatment with a tertiary amine base to form the silicon-substituted azonitrile. For example, the hydrazonitrile prepared according to Equation 3 can be oxidized as follows:

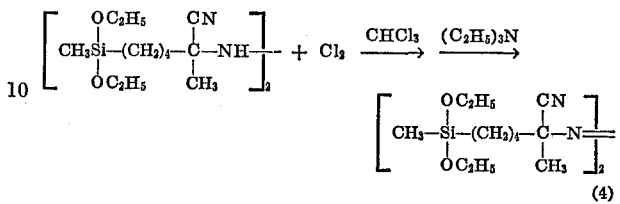

(4)

The product is a silicon-substituted azonitrile in which R and R''' are methyl, R' and R'' are ethoxy and Y is ethylene.

The oxidation reaction is conducted in an anhydrous solvent free of alcohols. Typical solvents are chloroform and ethyl ester. The solvent should be inert, that is, it should not react significantly with the hydrazonitrile, chlorine, or tertiary amine base.

The reaction is conduced ina vessel cooled to about —15° C. to about 10° C., preferably with mild agitation However, agitation is not required. The preferred temperature is about —5° C. to about 5° C.

Chlorine is used as the oxidant in about a stoichiometric amount. Large molar excesses of chlorine should be avoided. The chlorine can be added slowly over a period of time. Thus, the temperature of reaction can be more readily controlled. Since hydrogen chloride is liberated during the reaction, the reaction vessel should possess the required corrosion resistance.

The material from the preceding reaction is treated with a base, preferably a tertiary amine. Pyridine and triethyl amine are particularly preferred. The base should be one which when reacted with HCl does not yield water, and preferably forms a hydrochloride which is solid readily separable from the solvent. The hydrochloride should be separable from the reaction mass by means other than heating. It is convenient to remove by filtration the hydrochloride formed by the reaction of Equation 4.

After the removal of the hydrochloride, the product can be isolated from the solvent and any unreacted chlorine. Typically, isolation by application of vacuum to remove volatiles at room temperature or below is employed. Other methods will be obvious to the art skilled. Since the silicon-substituted azonitrile is sensitive to heat, the product should preferably be stored at about 5° C. or lower.

The reaction is typically conducted at atmospheric pressure until completion of the reaction as indicated by cessation of the evolution of heat. The reaction should be conducted under substantially anhydrous conditions. The sequence of reactions set forth above must be followed in order to obtain the silicon-substituted azonitriles.

The polymerization reaction is conducted by mixing reactants in a vessel in a batch or continuous manner. The reaction is generally conducted at a temperature of about 50° C. to about 110° C. The pressure in the reaction vessel is such that the monomers are retained therein.

An inert solvent can be used in the polymerization process. By "inert solvent" is meant any solvent for the reagents which does not react significantly with the monomers, initiators or polymer formed and does not chain transfer significantly. However, it is preferable to conduct a solution polymerization when preparing fluid polymers in order to obtain a narrow polymer molecular weight distribution. It is preferred that the chain transfer constants to the solvent and monomers be low. The use of alcohols as polymerization solvents may lead to exchange reactions occurring with the alkoxysilane groups of the initiator and/or polymer, but in some instances this is unobjectional.

The polymerization reaction is preferably conducted under substantially anhydrous conditions. This means that the reaction is preferably conducted in the practical absence of water or water vapor in order to minimize hydrolysis of the silicon-substituted azonitrile initiator and polymer.

The polymerization reaction is preferably conducted until completion as evidenced for gaseous monomer, for example, by leveling-off of pressure in the bomb. The time of reaction is dependent upon the temperature, amount and type of initiator, reactivity of the monomers, etc. The reaction can be terminated by cooling the reaction mixture, typically below about 25° C.

The polymerization reaction is conducted in the presence of an effective amount of the silicon-substituted azonitrile. This amount is dependent upon the molecular weight of the polymer desired and is determined as follows. For a high molecular weight polymer, a relatively small amount of initiator is required. Conversely, a low molecular polymer requires the use of a relatively large amount of initiator. The amount of initiator is dependent upon $\overline{DP}$ which is the number of monomer units in an average polymer chain and can be determined knowing the average chain length desired for the polymer. For example, for simple vinyl monomers such as ethylene, tetrafluoroethylene, styrene and ethyl acrylate, each monomer unit contributes 2 atoms to the main chain, so $\overline{DP}$ can be calculated as $$\overline{DP} = \frac{(\text{Chain length} - \text{number of atoms from initiator})}{2}$$

The second term in the numerator is a correction for the number of atoms contributed by initiator fragments to the chain length (usually about 2 fragments per chain). Some monomers, such as the conjugated dienes, 2-chloro-1,3-butadiene and 1,3-butadiene, polymerize predominantly in the so-called 1,4-manner so that $\overline{DP}$ can be calculated as $$\overline{DP} = \frac{(\text{Chain length} - \text{number of atoms from initiator})}{4}$$

In the event that a copolymer is made from two types of monomers the chain length may be determined by a combination of the above two equations and the mole fractions (x) of each monomer in the polymer:

$$\overline{DP} = \frac{(\text{Chain length} - \text{number of atoms from initiator})}{2x_A + 4x_B}$$

where $x_A$ = mole fraction of simple (1,2) monomer and $x_B$ = mole fraction of 1,4 addition monomer.

Combinations of other types of monomers can be calculated by analogous methods. The minimum amount of initiator required can then be determined from the following equation:

$$\text{Mole percent initiator} = \frac{1}{\overline{DP}} \times 100$$

The mole percent initiator (based on the total moles of monomers present) determined using this equation is the amount required to produce polymer of the desired molecular weight and assumes no chain transfer and that the initiator is 100% efficient. One skilled in the art will be able to use the above equations, allow a slight excess of initiator over that calculated, and with a minimum of experimentation determine the amount of initiator required to obtain the desired polymer.

Knowing relative monomer reactivities, one skilled in the art will readily be able to determine the relative amounts of monomers to use to obtain a desired copolymer. The ratios of monomers are not significantly affected by the silicon-substituted azonitrile initiator. That is, the ratios of monomers used will be about the same as that required when using other free radical initiators well known in the art.

The polymer can be isolated from the reaction mixture and recovered by conventional means, as for example, by vacuum distillation of solvent, heating, or precipitation of the polymer in a non-solvent. The isolation and recovery process should be conducted under substantially anhydrous conditions to minimize premature cross-linking of the polymer.

The substituent R' and R" on the silicon-substituted azonitrile used as the free radical initiator can be alkoxy radicals as previously noted. The alkoxysilane group is moisture reactive and can be used as a cure-site to cross-link polymer molecules. However, it has been found that if the alkoxysilane group is converted to an acyloxysilane group, that is,

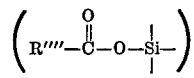

where R"" is hydrocarbyl, the curing rate can be increased. It is particularly preferred to convert the alkoxysilane group to an acetoxysilane group, that is,

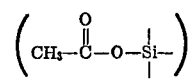

Conversion is usually accomplished after the polymer is formed. A silicon-substituted azonitrile having at least one alkoxysilane group can be used as the initiator, and the alkoxysilane groups attached to the polymer molecule formed can be converted to acyloxysilane groups.

The conversion involves the reaction of at least a stoichiometric amount of an acid anhydride with an alkoxysilane containing polymer. Any carboxylic acid anhydride used as an acylating agent can be used, however, preferred acid anhydrides contain 16 carbon atoms or less. The anhydrides can be substituted or unsubstituted aliphatic or aromatic acid anhydrides. Acetic anhydride is preferred. Typical of other useful aliphatic acid anhydrides are propanoic anhydride, butanoic anhydride, 2-methyl propanoic anhydride, pentanoic anhydride, hexanoic anhydride, and heptanoic anhydride. It is preferred to use an excess of the acid anhydride. For example, an excess of at least 50% is preferably added to remove any water present. It is also preferred to use an acid anhydride which is at least partially miscible with the polymer at reaction temperature.

A solvent having a relatively high boiling point can be used in the conversion reaction. However, a solvent is generally not used since it often must be removed from the polymer after the conversion reaction.

The conversion reaction is generally conducted at a temperature of about 120° C. to about 200° C., preferably about 140° C. to about 170° C. The time of reaction is dependent upon temperature and the acid anhydride used and is typically about 2 to about 24 hours. The reaction is preferaby conducted at a temperature at or below the boiling points of the reactants.

The conversion reaction is generally conducted under substantially anhydrous conditions to prevent hydrolysis of the silicon containing groups. It is important to conduct the reaction in an inert atmosphere, such as anhydrous nitrogen gas. By "inert atmosphere" is meant the acid anhydride, solvent or polymer, do not react with substances in the atmosphere.

Ester formed during the conversion reaction can optionally be removed during the reaction. The polymer can be isolated after the reaction by conventional techniques, for example, vacuum distillation of excess anhydride and solvent at less than about 100° C. If vacuum distillation is employed, prolonged heating and exposure to vacuum after removal of volatiles should be avoided.

Some polymers prepared according to the processes of this invention can be cured to useful elastomers. The fluid polymers are particularly useful as moisture curable caulks when used alone or compounded with other ingredients. The ingredients used should be substantially anhydrous in order to minimize hydrolysis of the moisture reactive silicon groups on the polymer chains. Plasticizers, softeners and extenders conventional in rubber compounding can be used to the extent that they do not react with the silicon groups. Pigments, dyes or other fillers can also be added. It is convenient to add the compounding ingredients, with a minor amount of an acid anhydride to remove any moisture present, during the reaction converting the alkoxysilane groups to acyloxysilane groups. Typical fillers and extenders include carbon black, diatomaceous earth, barium sulfate, clay, aluminum silicate, silica and titanium dioxide. An inert anhydrous solvent can also be added. When the polymers are used as high solids caulking compounds, the amount of solvent should be small to minimize shrinkage of the caulk upon evaporation of the solvent.

The term "alkyl" as used herein refers to saturated $C_1$–$C_{18}$ hydrocarbon groups. The term "lower alkyl," "lower alkoxy," etc., refers to the respective groups containing 8 or less carbon atoms in the alkyl group.

The following examples are illustrative of this invention. All parts, proportions, and percentages are by weight unless otherwise specified.

EXAMPLE 1

Preparation of silicon-substituted azonitrile free radical polymerization initiator (A) Preparation of 5-hexene-2-one azine.—To a 500 ml. round bottom flask 98 g. of 5-hexene-2-one and 25 ml. of hydrazine hydrate is added at about 25° C. (the reaction is exothermic). The mixture is stirred and heated at 100° C. for 6 hours. At the end of that time the organic layer is separated, dried over anhydrous $MgSO_4$, filtered, and distilled on a spinning band colum. The 74.1 g. of product having a B.P. of 130° C./23 mm., and $n_D^{26}$ 1.4786 is collected.

(B) Preparation of 6-(methyldichlorosilyl)-hexane-2-one azine.—Into an apparatus similar to that of Part C, 144 g. of 5-hexene-2-one azine and 2 drops of chloroplatinic acid are charged at 25° C. Methyldichlorosilane (172 ml.) is poured into the addition funnel, and 15 ml. of that into the flask. An exothermic reaction takes place, and as addition is continued the temperature rises to 74° C. The temperature is then controlled with a wet ice bath to between 50° C. and 70° C. The addition takes a total of 1.5 hours.

The next day, a distillation is started on a spinning back column under vacuum, but when the pot gets quite warm, the pressure rises (from 0.4 to 2.0 mm.), and when the pot is cooled the pressure drops. It is evident that the material is decomposing on heating, and the next day, after cooling, it is very viscous.

A similar run is made, except the temperature is controlled to 50° C.–60° C., the total addition time is 1.25 hours, and it is allowed to stir for an additional 1.5 hours. This reaction mixture is then converted directly to the diethoxysilane.

(C) Preparation of 6-(methyldiethoxysilyl)-hexane-2-one azine.—The crude reaction mixture from the preparation of 6-(methyldichlorosilyl)hexane-2-one azine (from B) is transferred to a 3-liter 3-necked round bottom flask equipped with condenser, mechanical stirrer, 250 ml. addition funnel. Under nitrogen, the flask contents are diluted with 1 liter of hexane and 456 ml. of triethylamine at 25° C. Ethanol (192 ml.), which has been added to the addition funnel, is then added dropwise to the flask over a period of 1.5 hours. The reaction is exothermic as evidenced by refluxing of solvent and the mixture becomes quite viscous and difficult to stir because of the solid which forms.

After stirring overnight, the mixture is filtered, the filtrate washed twice with water, dried over anhydrous $K_2CO_3$, filtered, and the solvent removed under vacuum on a rotary evaporator. Upon distillation, about 233 g. (69% of theoretical) of 6-(methyldiethoxysilyl)hexane-2-one azine, boiling point 162° C./0.25 mm., $n_D^{25}$ 1.4533, is isolated.

(D) Preparation of 1,2-bis(6-methyldiethoxysilyl-2-cyano-2-hexyl)hydrazine.—Into a 400 ml. stainless steel bomb are loaded 65 g. of 6-methyldiethoxysilylhexan-2-one azine and 60 ml. of HCN. The bomb is sealed and heated at 75° C. for four hours. The bomb is emptied, and the material, now an orange liquid, is transferred to a 300 ml. flask. Unreacted HCN is removed by applying a vacuum (0.5–1.0 mm. abs. pressure) for two hours, while the flask is in a wet ice bath, giving a viscous liquid.

Analysis: Calcd. for $C_{24}H_{50}N_4O_4Si_2$ (percent): C, 56.0; H, 9.8; N, 10.9. Found (percent): C, 55.4; H, 9.6; N, 10.7, 10.9. Both the infrared and NMR spectra are in agreement with the structure.

(E) Preparation of azobis-2(6-methyldiethoxysilyl-2-cyanohexane).—Into a 1-liter 3-necked round-bottom flask equipped with condenser, magnetic stirrer, gas inlet tube, and thermometer is added 114 g. of 1,2-bis(6-methyldiethoxysilyl-2-cyano-2-hexyl)hydrazine of D above and about 600 ml. of chloroform chromatographically purified by passing through a column of silica gel. The flash is cooled to about −8° C. in a NaCl/wet ice bath and then chlorine is bubbled in during four separate periods of 3–5 minutes each. The temperature during this time is −8° C. to −2° C. After each chlorine addition, a drop of solution is removed and tested with wet (water) starch-iodide paper. At about the end of the fourth addition the characteristic blue color indicative of free chlorine is noted.

The flash contents are subjected to a vacuum for 45 minutes (removing most of the chloroform), and then 35 ml. of pyridine is added. The orange solution is stirred for one hour at about 25° C., and then added to 2 liters of pentane with stirring. A white precipitate forms. The resulting mixture is placed in a freezer overnight at about −10° C.

The next day the mixture is filtered and the solvent is then removed under vacuum from the filtrate on a rotary evaporator overnight, yielding about 105 g. of a yellow liquid (92% of theoretical).

Analysis: Calcd. for $C_{24}H_{48}N_4O_4Si_2$ (percent): C, 56.2; H, 9.4; N, 10.9. Found (percent): C, 54.3; H, 8.9; N, 11.0, 11.0. The infrared and NMR spectra and chemical properties of this material are in accordance with the structure of azobis-2(6-methyldiethoxysilyl-2-cyanohexane).

EXAMPLE 2

Preparation of an ethyl acrylate polymer having moisture reactive silicon groups To a 1-liter 3-necked round-bottom flask equipped with a magnetic stirrer, condenser, and 250 ml. addition funnel an blanketed with nitrogen is added 400 ml. of benzene. To the addition funnel is added 55 ml. of ethyl acrylate and enough benzene to make a total volume of 148 ml. The benzene in the flask is refluxed and 6.0 g. of azobis 2-(6-methyldiethoxysilyl-2-cyanohexane) prepared as in Part E of Example 1, is added by hypodermic syringe. Immediately, addition of ethyl acrylate from the addition funnel is started and added at such a rate that about half of the solution is added every 1–10 minutes, at least until about 80% has been added. The total time of addition is about 2.5 hours and the solution is refluxed an additional 30 minutes after all the ethyl acrylate is added.

The solvent is removed under vacuum using a rotary evaporator leaving about 50.4 g. of a very viscous liquid. The material is poured into a mold for tension testing and stored at about 25° C. and 75% relative humidity for 33 days, at the end of which time its vulcanizate properties are tested using an Instron tester at a crosshead speed of 20″/minute according to ASTM method D412. Hardness is tested by ASTM method 2240. Properties obtained are:

$M_{100}$ ---- 34
$T_B$ ---- 56
$E_B$ ---- 140
Shore Hardness (A) ---- 16

Analysis indicates that the material is composed of 61.6% carbon, 5.8% hydrogen, and 0.64% nitrogen.

EXAMPLE 3

Preparation of perfluoromethylvinyl ether/methyl-vinyl ether polymer having moisture reactive silicon groups Into a 400-ml. bomb tube is loaded 200 ml. of methyl acetate and 5.5 g. of azobis-2-(6-methyldiethoxysilyl-2-cyano-hexane). The bomb is closed and 50 g. of perfluoro (methyl vinyl ether) (PMVE) prepared as in Example 2 of U.S. Patent 3,180,895 and 20 g. of methyl vinyl ether (MVE) are added. The tube is shaken and heated at 85° C. for 4 hours. After cooling, the material is taken out and the solvent removed under vacuum at 50° C., leaving a residue of about 62 g. of a putty like polymer. Analysis indicates that this polymer is composed of 34.9% carbon, 3.3% hydrogen, and 0.48% nitrogen. It has a number average molecular weight of about 5100 as determined by vapor phase osmometry.

Into a 100-ml. resin kettle are charged 20 g. of the above polymer and 10 ml. of acetic anhydride. The kettle is flushed with nitrogen, and the contents are stirred and heated in an oil bath at 150–160° C. for about 16 hours. The unreacted acetic anhydride is removed under vacuum at 80° C., the reaction mass is cooled and molded into test pieces in a stainless steel mold having 0.75″ x 5″ x 0.075″ cavities. The molds are placed in chamber at 25° C. and 75% relative humidity. After several hours a cured skin forms. The pieces are tested after 7 days and have the following physical properties (crosshead speed is 10″/minute):

| | |
|---|---|
| $M_{100}$ | 20 |
| $T_B$ | 125 |
| $E_B$ | 310 |
| Shore Hardness (A) | 17 |

The cured material swelled only 1 weight percent in octane (ASTM method D471), and lost only 3 weight percent on heat aging at 176° C. for 7 days.

EXAMPLE 4

Preparation of choloroprene polymer having moisture reactive silicon groups

From a preparation similar to that in Example 2 except 3.9 g. of azobis 2-(6-methyldiethoxysilyl-2-cyanohexane) and 84.9 g. of freshly distilled chloroprene (2-chloro-1,3-butadiene) are used (the latter in place of the ethyl acrylate), about 33.9 g. of a viscous liquid polymer is prepared. Analysis indicates that the polymer contains 33.6% chlorine.

About 15 g. of the polymer is added under a nitrogen atmosphere to a resin kettle equipped with a mechanical stirrer. The material is stirred, 10 ml. of acetic anhydride is added, and the solution is heated at 160° C. for 5.5 hours. The anhydride is removed at 80° C. under vacuum, and the resulting sticky polymer is placed in a mold. The polymer cures to an elastomeric material almost immediately.

EXAMPLE 5

Preparation of a fluoro-polymer having moisture reactive silicon groups

Into a 400-ml. bomb are charged 200 ml. of methyl acetate, 27 g. of 1,1,1,3,3,3-hexafluoro-2-propyl vinyl ether, 14 g. of methyl vinyl ether, 30 g. of tetrafluoroethylene, and 5.7 g. of azobis 2-(6-methyldiethoxysilyl-2-cyanohexane). The bomb is heated at 85° C. for 4 hours while being shaken. The resulting solution is transferred to a bottle and is subjected to a vacuum at 50° C. to remove the solvent. A yield of about 51.1 g. of polymer having a number average molecular weight of 4,100 and being composed of 37.3% carbon, 3.8% hydrogen, and 48.0% fluorine is obtained.

A piece is prepared for curing by reaction with acetic anhydride, and cured, in an identical manner to that in Example 3, except that 13 g. of polymer are used. After curing one week, the pieces have the following properties (crosshead speed is 10″/minute):

| | |
|---|---|
| $M_{100}$ | 15 |
| $T_B$ | 70 |
| $E_B$ | 280 |
| Shore Hardness (A) | 14 |

The cured material swells only 25 weight percent in toluene, and loses only 1 weight percent after heat aging at 176° C. for 8 days.

EXAMPLE 6

Preparation of 1,1,3,3-H-tridecafluorooctyl vinyl ether/ TFE polymer having moisture reactive silicon groups Into a 240-ml. bomb tube is loaded 120 ml. of methyl acetate, 40 g. 1,1,3,3-H-tridecafluorooctyl vinyl ether, 2.7 g. of azobis 2-(6-methyldiethoxysilyl-2-cyanohexane), and 15 g. of tetrafluoroethylene (TFE). The tube is shaken and heated at 85° C. for 4 hours. The material is cooled and removed from the bomb, and the solvent is removed under vacuum at 50° C. The residue, about 26.4 g. of a putty like polymer has a number average molecular weight of about 8,850, and is composed of 31.4% carbon, 2.0% hydrogen, and 56.2% fluorine.

Acetic anhydride (10 ml.) is reacted with the polymer (15 g.) in a manner similar to that in Example 3. The resulting material is molded into test pieces, and cured for 7 days at about 25° C. and 75% relative humidity. The cured elastomeric product has the following properties (crosshead speed is 10″/minute):

| | |
|---|---|
| $M_{100}$ | 5 |
| $T_B$ | 90 |
| $E_B$ | 360 |
| Shore Hardness (A) | 7 |

The elastomer does not swell significantly in octane.

EXAMPLE 7

Preparation of a tetrafluoroethylene/methyl vinyl ether caulk

Into a 400-ml. bomb is loaded 200 ml. of ethyl acetate and 5.4 g. of azobis(6-methyldiethoxysilyl-2-cyano-2-hexane). The bomb is sealed and evacuated, and 15 g. of methyl vinyl ether and 25 g. of tetrafluoroethylene are added. The bomb is shaken, and heated at 85° C. for four hours. After cooling, the solution is removed, and the solvent is stripped under vacuum, leaving 38.7 g. of a putty-like polymer. The polymer has a number average molecular weight of 3630, and is composed of 40.5% carbon and 4.5% hydrogen.

Some of the polymer (22 g.) is placed in a resin kettle containing a nitrogen atmosphere and 5.0 ml. of acetic anhydride is added. The mixture is heated at 150° C. for two hours and then cooled. After removing the volatiles at 80° C. under vacuum, the polymer remaining is molded into test pieces and placed in a 75% relative humidity chamber at about 25° C. After two hours, the exposed surface has a cured "skin" and after further moisture curing for seven days, the vulcanizate has the following properties (cross head speed 10 inches/minute):

| | |
|---|---|
| $M_{100}$ | 85 |
| $T_B$ | 350 |
| $E_B$ | 250 |
| Shore Hardness (A) | 41 |

The material does not swell in octane.

What is claimed is:

1. A process for the preparation of a polymer curable with moisture consisting essentially of contacting, under substantially anhydrous conditions at a temperature of about 50 to 100° C., (a) at least one ethylenically unsaturated monomer reactive with azonitrile and free of functional groups reactive with alkoxysilanes and acyloxysilanes, and
(b) an effective amount of an azonitrile of the formula

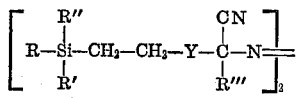

where R is $C_1$–$C_{18}$ alkyl, fluorosubstituted $C_3$–$C_{18}$ alkyl wherein the fluorosubstituent is no closer than the gamma position with respect to Si, phenyl, $C_1$–$C_8$ alkyl-substituted phenyl, fluorosubstituted phenyl, benzyl, or $C_1$–$C_8$ alkyl-substituted benzyl;

R' is $C_1$–$C_8$ alkoxy, aryloxy, alkaryloxy wherein the alkyl group is $C_1$–$C_{18}$, or aralkoxy wherein the alkyl group is $C_1$–$C_8$;

R" is independent of R and R' and is any of the groups representing R or R';

R''' is $C_1$–$C_8$ alkyl, $C_1$–$C_8$ alkyl substituted phenyl, benzyl, or $C_1$–$C_8$ alkyl substituted benzyl wherein substitution is at other than the alpha position; and Y is a saturated $C_1$–$C_8$ alkenylene;

to prepare polymer containing about 40 to 400 carbon atoms in its backbone chain and curable to an elastomer.

2. The process of claim 1 wherein an inert solvent is present during the contacting.

3. The process of claim 2 wherein the ethylenically unsaturated monomer is at least one of chloroprene and a $C_1$–$C_6$ alkyl ester of acrylic acid.

4. The process of claim 2 wherein an alkyl vinyl ether having less than 11 carbon atoms and one of perfluoromethyl vinyl ether and tetrafluoroethylene are copolymerized with said azonitrile.

5. The process of claim 2 wherein tetrafluoroethylene and at least one of
(1) a compound of the formula

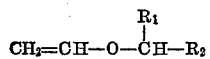

wherein $R_1$ is a fluorosubstituted $C_1$–$C_8$ alkyl, and $R_2$ is hydrogen or a fluorosubstituted $C_1$–$C_6$ alkyl, and
(2) an alkyl vinyl ether having less than 11 carbon atoms, are copolymerized with said azonitrile.

6. The process of claim 2 wherein the azonitrile has the formula

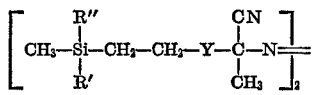

where R' and R" are methoxy or ethoxy, and Y is methylene or ethylene, and the resulting polymer has an average of about 74 to 250 carbon atoms in the polymer backbone and is curable to an elastomer.

7. The process of claim 6 wherein the ethylenically unsaturated monomer is at least one of chloroprene and a $C_1$–$C_6$ alkyl ester of acrylic acid.

8. The process of claim 6 wherein an alkyl vinyl ether having less than 11 carbon atoms and one of perfluoromethyl vinyl ether and tetrafluoroethylene are copolymerized with said azonitrile.

9. The process of claim 6 wherein tetrafluoroethylene and at least one of
(1) a compound of the formula

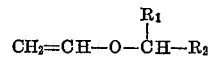

where $R_1$ is a fluorosubstituted $C_1$–$C_8$ alkyl, and $R_2$ is hydrogen or a fluorosubstituted $C_1$–$C_6$ alkyl, and
(2) an alkyl vinyl ether having less than 11 carbon atoms, are copolymerized with said azonitrile.

10. The process of claim 2 wherein resulting polymer is treated under substantially anhydrous conditions in an inert atmosphere with at least a stoichiometric amount of a monocarboxylic acid anhydride at a temperature of about 120 to 200° C.

11. The process of claim 10 wherein the anhydride is acetic anhydrde and R' and R" are acetoxy.

12. Polymer prepared by the process of claim 1.
13. Polymer prepared by the process of claim 10.
14. Moisture-cured polymer of claim 12.
15. Moisture-cured polymer of claim 13.

References Cited

UNITED STATES PATENTS

| | | | |
|---|---|---|---|
| 3,617,362 | 11/1971 | Bemmels et al. | 117—122 |
| 3,655,633 | 4/1972 | Saam | 260—79 |
| 2,471,959 | 5/1949 | Hunt | 260—89.5 |
| 2,698,861 | 1/1955 | Shorr | 260—448.8 |
| 2,823,218 | 2/1958 | Speier et al. | 260—448.2 |
| 3,324,089 | 6/1967 | Trepka | 260—79.5 |
| 3,375,236 | 3/1968 | Van de Castle et al. | 260—80 |
| 3,450,686 | 6/1969 | Mortimer | 260—949 |
| 3,458,546 | 7/1969 | Danley et al. | 260—429.7 |

FOREIGN PATENTS

| | | |
|---|---|---|
| 604,107 | 8/1960 | Canada. |
| 785,983 | 11/1957 | England. |

JOSEPH L. SCHOFER, Primary Examiner

S. M. LEVIN, Assistant Examiner

U.S. Cl. X.R.

260—41 A, 41 B, 41 C, 41 D, 80 PS, 80.76, 86.1 R, 87.5 A, 89.5 A, 92.3, 593 R, 615 B